United States Patent [19]

Pinson

[11] Patent Number: 4,895,426

[45] Date of Patent: Jan. 23, 1990

[54] ELECTRICALLY CONDUCTING REINFORCED OPTICAL FIBER

[75] Inventor: George T. Pinson, Huntsville, Ala.

[73] Assignee: The Boeing Company, Seattle, Wash.

[21] Appl. No.: 247,089

[22] Filed: Sep. 20, 1988

[51] Int. Cl.⁴ .................................................. G12B 6/44
[52] U.S. Cl. ................................ 350/96.23; 174/70 R; 174/71 R
[58] Field of Search ............... 350/96.23, 96.33, 96.20, 350/96.21; 174/70 R, 71 R

[56] References Cited

U.S. PATENT DOCUMENTS

| | | | |
|---|---|---|---|
| 3,865,466 | 2/1975 | Slaughter | 350/96.25 |
| 4,009,932 | 3/1977 | Ferrentino | 350/96 B |
| 4,095,101 | 6/1978 | Lemelson | 350/96.10 |
| 4,129,468 | 12/1978 | Knab | 156/148 |
| 4,158,478 | 6/1979 | D'Auria et al. | 350/96.23 |
| 4,272,155 | 6/1981 | Slaughter | 350/96.23 |
| 4,365,865 | 12/1982 | Stiles | 350/96.23 |
| 4,497,537 | 2/1985 | Dench | 350/96.23 |
| 4,525,702 | 6/1985 | Kitagawa et al. | 350/96.23 |
| 4,629,286 | 12/1986 | Fuse et al. | 350/96.23 |
| 4,659,174 | 4/1987 | Ditscheid et al. | 350/96.23 |
| 4,660,928 | 4/1987 | Jaeger et al. | 350/96.33 |
| 4,723,832 | 2/1988 | Okazato et al. | 350/96.23 |
| 4,730,894 | 3/1988 | Arroyo | 350/96.23 |
| 4,738,505 | 4/1988 | Jones | 350/96.23 |

FOREIGN PATENT DOCUMENTS

| | | | |
|---|---|---|---|
| 2541178 | 3/1977 | Fed. Rep. of Germany | 350/96.23 |
| 3003760 | 8/1981 | Fed. Rep. of Germany | 350/96.23 |
| 0017713 | 1/1987 | Japan | 350/96.23 |
| 1598438 | 9/1981 | United Kingdom . | |
| 2105865 | 3/1983 | United Kingdom | 350/96.23 |

*Primary Examiner*—Frank Gonzalez
*Attorney, Agent, or Firm*—Finnegan, Henderson, Farabow, Garrett & Dunner

[57] ABSTRACT

Apparatus for interconnecting a missile/RCV launch device with a remote control station includes composite cable having glass fibers for transmitting optical signals and electrical conductors embedded in a coating layer that is reinforced with fibers, for transmitting electric power. The apparatus also includes electrical and optical connectors at the cable end portions wherein the reinforcing fibers are grouped with the glass fiber at termination.

11 Claims, 2 Drawing Sheets

ELECTRICALLY CONDUCTING REINFORCED OPTICAL FIBER

BACKGROUND

1. Field of the Invention

This invention relates to optical fibers, and particular to coated, reinforced optical fibers having integrated electrical conductors.

2. Description of the Prior Art

Optical fibers typically are used to provide large bandwidth two-way communication between sender and receiver units. If the sender/receiver units are electrically active, the message sent over the optical fiber can be converted and interpreted by the system electronics to effect some desired action. If, however, one of the sender/receiver units is electrically inactive, no action can be effected by the electrically inert unit.

Currently, an optical fiber has been used for two-way communication between transceivers located at each end of the optical fiber in an optical fiber-connected missile launch system. However, in some such systems, the launch device preferably should remain electrically dormant until immediately before launch to prevent detection and to conserve power. Heretofore, a separate electrical connection had to be made to activate the inert transceiver before a communication link could be established. Such a situation can occur, for example, with a remotely launched missile or in remotely controlled vehicle ("RCV") systems.

Cable constructions having both optical fibers and electrical conductors are known, and representative of these are the constructions described in U.S. Pat. No. 4,660,928 (Jaeger et al.), U.S. Pat. No. 4,158,478 (D'Auria et al.), and U.S. Pat. No. 4,365,865 (Stiles). In general, the prior art constructions are not ideally suited for applications requiring a relatively high electric power transmission capability (e.g., several hundred watts, steady state) while retaining the strength, compactness and flexibility required e.g., for tactical missile systems.

SUMMARY OF THE INVENTION

In accordance with the invention, as embodied and broadly described herein, the apparatus for providing combined large bandwidth optical signal communication and high electric power transmission between two spaced locations comprises an integral elongated fiber core of a first glass material for transmitting optical signals; an integral layer of a second, glass-like material intimately surrounding the fiber core and having a refractive index less than the first glass material; and a coating layer of a plastic material intimately surrounding the glass-like material layer. Conductor means for transmitting electrical power are embedded in the coating layer, and reinforcing means also are embedded in the coating layer.

Preferably, the conductor means includes a plurality of individual conductive members extending generally parallel to, and circumferentially spaced around, the core, wherein at least one of the individual conductive members is insulated with respect to the coating layer. It is also preferred that the reinforcing means includes reinforcing fibers distributed throughout the coating.

Further in accordance with the present invention, as embodied and broadly described herein, the apparatus for interconnecting a missile launch device with a remote missile launch controller station comprises cable means including a glass fiber core, a glass-like material covering layer a fiber reinforced coating, and electrical conductors embedded in the coating, the cable means for transmitting electrical power and optical control signals from the vicinity of the control station to the vicinity of the launch device. The cable means has respective end portions proximate the control station and the launch device and includes means for terminating the end portions and for separately receiving from each end portion (a) the conductor means, and (b) the glass fiber core together, the glass-like material layer, and the reinforcing fibers. The terminating means includes respective electrical connectors and optical fiber connectors associated with the control station and the launch device.

Preferably, at least the electrical connector associated with the launch device is of the breakaway type, and at least the conductor means portion receivable at the launch device is configured as a pigtail and is separately electrically insulated.

It may also be preferred that the control station include means for transmitting high voltage AC electrical power and the terminating means includes a step-down transformer and rectifier operatively connected to the received conductor means proximate the launch device.

BRIEF DESCRIPTION OF THE DRAWINGS

The accompanying drawings which are incorporated in, and constitute a part of, this specification illustrate a preferred embodiment of the invention and, together with the description, serve to explain the principles of the invention.

Of the drawings.

Reference will now be made to the present preferred embodiment of the invention which is illustrated in the accompanying drawing.

DESCRIPTION OF THE PREFERRED EMBODIMENT

Figure 1:
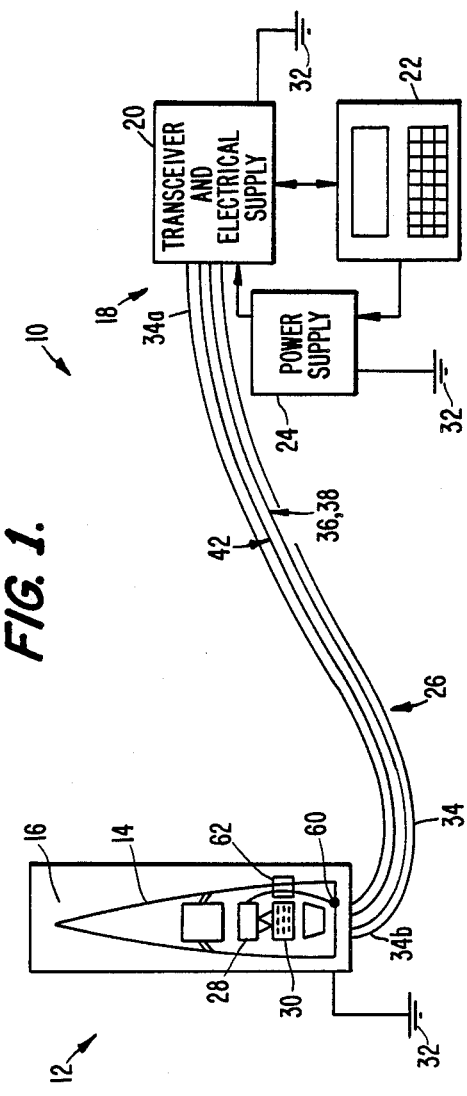
FIG. 1 is a schematic of a missile launch system utilizing interconnection apparatus made in accordance with the present invention.

With initial reference to FIG. 1, there is shown a missile launch system designated generally by the numeral 10 and including launch device 12 having missile or RCV 14 in launch tube 16. Remotely separated from launch device is launch/control station 18 including transceiver 20, controller 22 and power supply 24. Launch device 12 is interconnected to remote launch-/controller 18 via apparatus designated generally 26 which will be described in more detail hereinafter. Although this invention is described primarily for application to a fiber optic-guided missile or remotely controlled vehicle, the invention is not restricted to this limited use. Other uses for the invention will become apparent as the constructions and configurations are described.

Referring again to FIG. 1, missile 14 usually is located at some remote place and enclosed in a launcher or storage container 16. An internal power source such as thermal battery 28, for example, is activated by the firing of an associated electrical squib. The squib is fired by the action of electrical power of proper magnitude and duration which is transmitted over interconnecting apparatus 26. After the squib is fired, thermal action automatically activates the battery 28. When the battery power output rises to the proper level, the missile onboard electrical system 30 is activated and either preprogrammed events are initiated or the electrical system, which may be either analog or digital in design, is enabled to receive commands from control station 18 over interconnecting apparatus 26. In FIG. 1, a common electrical ground 32 is used although a separate, isolated ground can be incorporated in apparatus 26 as will be described later.

In accordance with the present invention, the interconnecting apparatus includes a cable component having an integral, elongated fiber core of a first glass material for transmitting optical signals, an integral layer of a second glass or suitable plastic material (collectively, "glass-like material") intimately surrounding the core, and a coating layer or "jacket" of a plastic material intimately surrounding the glass layer. Importantly, conductor means for transmitting electrical power are protectively embedded in the coating layer and extend essentially parallel to the glass fiber core. Reinforcing means are provided in the coating layer for longitudinal strength.

Figure 2:
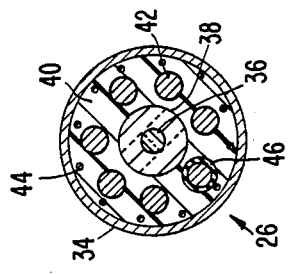
FIG. 2 is a schematic axial cross-section of one embodiment of the cable component of interconnection apparatus depicted in FIG. 1.

As embodied herein, interconnecting apparatus 26 includes cable component 34 extending generally between launch device 12 and control station 18. Referring now to FIG. 2, cable 34 is made up of glass core 36 of one refractive index surrounded by an outer glass-like material layer 38 of slightly less refractive index, which layer is fused to glass core 36. Cable 34 further includes outer coating layer 40 which includes a plurality of embedded electrical conductive members 42 and reinforcing fibers 44. The coating 40 with reinforcing fibers previously described in my copending application Ser. No. 032,242 filed Mar. 31, 1987 entitled "Method of Manufacturing Reinforced Optical Fiber" can be used for coating 40 if one or multiple electrical conductors 42 are substituted for some of the fibers. One or more of the individual conductors 42 may be separately insulated as required for a particular application, such as with insulation 46 (FIG. 2). Conductors 42 may be helically wrapped or braided extend generally parallel to the direction of glass core 36. Coating 40 can be of any suitable material that provides the necessary strength, environmental and electrical protection. Such materials include reinforced or non-reinforced plastics (thermoplastic or thermosetting), and silicon acrolate-type materials.

Although the size of the individual conductors 42 limits the power that can be transmitted, braiding of the wires constitutes, in effect, a stranded wire bundle that is capable of carrying significant electrical power for a relatively short time period. If it is required to provide a return ground, that is, instead of common ground 32 (FIG. 1), one or more of conductors 42 can be electrically insulated as with insulation 46.

Figure 3B:
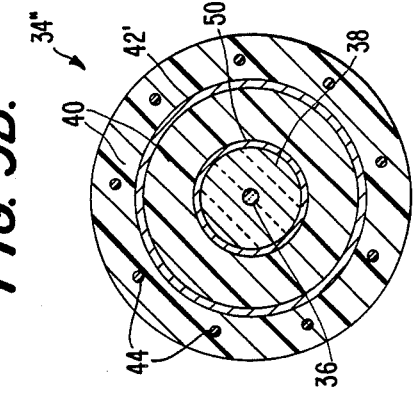
FIGS. 3A and 3B are schematic axial cross-sections of variations of another embodiment of the cable component.
Figure 3A:
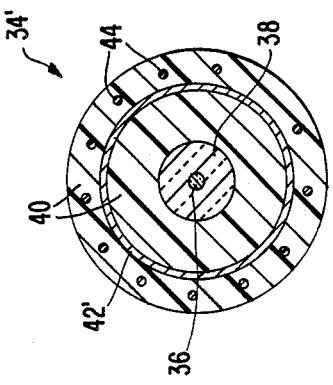

Referring now to FIGS. 3A and 3B it is recognized that numerous variations in the placement and shape of the electrically conductive/non-conductive components of cable 34 of interconnecting apparatus 26 are possible. These variations are primarily to accomplish manufacturing simplicity and reliability in use and do not constitute a departure from the invention. In FIGS. 3A and 3B previously defined (FIG. 2) optical glass fiber elements 36, 38 and plastic coating 40 with reinforcing fibers 44 are present. In the embodiment depicted in FIG. 1, the use of common ground 32 permits the use of the cable component variation shown in FIG. 3A, and designated as 34', having a single electrical conductor 42' of a metallic sheath-type. Conductor 42' can be placed anywhere within the outer coating layer 40 with the proviso that electrical isolation be maintained. Note also that, if desired, multiple sheath-type conductors 42' can be placed inside the outer layer 40.

A return ground in the nature of an electric conductor can be provided as indicated in the cable component variation 34 FIG. 3B and designated by the numeral 50. The absolute positions of electrical conductors 42' and 50 are not critical so long as a desired maximum diameter and electrical isolation are maintained. Note also that multiple conductors 42' with a common, or multiple grounds 50 can be provided as desired.

In accordance with the present invention, the interconnection apparatus includes means for terminating the end portions of the cable and for separately receiving from each end portion (a) the electrical conductor means and (b) the glass fiber core together with the glass layer and the reinforcing fibers. The terminating means also includes respective electrical connectors and optical fiber connectors associated with the control station and with the launch device.

Figure 4:
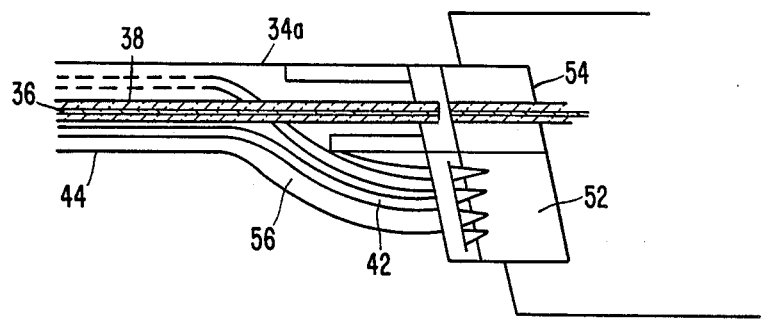
FIG. 4 is an enlarged detail of the termination at the controller station of the interconnection apparatus shown in FIG. 1.

As embodied herein, termination of the elements of end portion 34a of cable are illustrated in FIG. 4 for control station 18 and the cable component depicted in FIG. 2. In FIG. 4, electrical conductors 42 are removed from coating layer 40 and are terminated by clamping or soldering to standard electrical connector 52, while glass core 36 and glass-like material covering layer 38 are attached to standard optical fiber connector 54. Separate insulation 45 can be used to provide electrical insulation if the removed conductors 42 are not insulated.

Figure 5A:
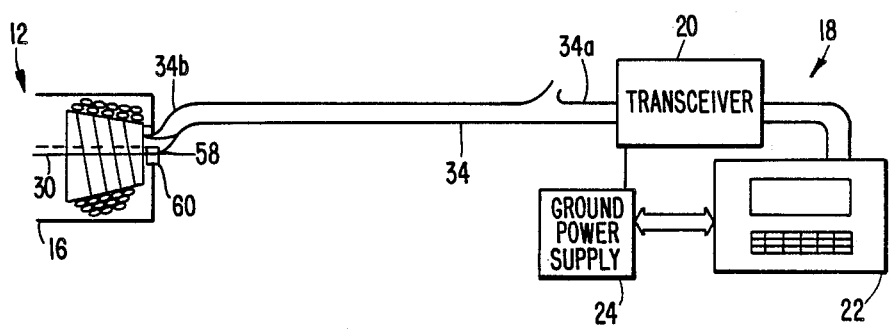
FIG. 5A and 5B are enlarged details of the termination at the missile launch device of the interconnecting apparatus shown in FIG. 1.
Figure 5B:
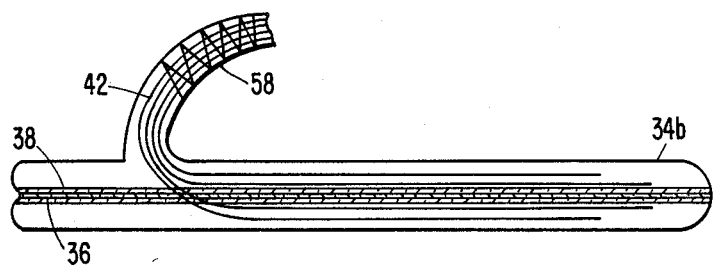

Termination of cable end portion 34b at launch device 12, occurs prior to any taper between reinforcing fibers 44 and the balance of the cable component. Reinforcing fibers 44 must be strong enough such that electrical conductors 42 will break and separate from missile 14 under a relatively low force. Referring now to FIG. 5A, conductors 42 are removed from coating layer 40 and reinforced fibers 44, and may be preferably provided as pigtail 58 (see FIGS. 5B) and connected to standard breakaway electrical connector 60. The 58 missile side of breakaway connector 60 is firmly attached to missile internal electrical system 30. Prior to launch or system activation, pigtail 58 is connected to breakaway connector 60. Upon command from controller 22 ground power supply 24 energizes conductors 42 with the desired voltage and current. The duration of the electrical power transmission is also controlled by controller 22.

The embodiments depicted in FIG. 2 and especially FIGS. 3A and 3B, have a disadvantage in that the thickness of the conductors 42 and 42' limit the DC current carrying capability of cable 34, and the resistance/foot of cable 34 may be large. Therefore using as thick a coating layer 40 as practical and transmitting a relatively high AC voltage and low current over cable 34 will permit significant electrical energy transmission distances to be achieved. The high voltages may require that the termination means include stepdown transformer/rectifier/conditioner 62 to be used. Conversion of AC to DC is accomplished by transformer/rectifier/element 62.

The method of fabrication of the preferred cable embodiment depicted in FIG. 2 is described in detail in the related patent application Ser. No. 032,242 and the fabrication of the alternate electrical sheath conductor elements 42' and 50 depicted in FIGS. 3A and 3B makes use of conventional continuous vapor deposition and sputtering techniques. The interconnecting apparatus of the present invention also can be made as a cable harness assembly, that is, including mating electrical and optical connector portions integrated with the cable component. As previously discussed, the power transmitted may be AC or DC and, depending upon the distance and power level to be transmitted, either high or low voltage. Power conditioners such as transformer/rectifier/conditioner 62 are provided as necessary. The transmitted electrical power is primarily to initiate or perpetuate some electrical action that is needed on the electrically inert side of the circuit fiber optic control.

It should now be understood that the described interconnection apparatus of combined electrical power and optical signal transmission can provide either long term or short term electrical power to a remote subsystem where electrical power is needed and a high bandwidth data limit as can be provided by optical fibers is required. The present interconnection apparatus invention also allows capacitors to be changed and batteries to be charged over long periods of time such as by continuous low electrical power transmission. The low power consumption of digital electronics will allow remote powered sensors to be electrically powered and use the relatively EMI (Electro-Magnetic Interference), EMP (Electro-Magnetic Pulse) proof optical fiber to transmit the data through a hostile environment.

It will be apparent to those skilled in the art that various modifications and variations can be made in the above-described interconnecting apparatus invention without departing from the scope or spirit of the invention. Thus, it is intended that the present invention cover such modifications and variations provided they come within the scope of the appended claims and their equivalents.

What is claimed is:

1. Cable apparatus for providing combined large bandwidth optical signal communication and electric power transmission between two spaced locations, the cable comprising:

an integral centrally located elongated fiber core of a first glass material for transmitting optical signals, said first glass material having a first refractive index;

an integral layer of a glass-like material intimately surrounding said fiber core, said glass-like material having a second refractive index less than said first refractive index;

a coating layer of a plastic material intimately surrounding said glass-like material layer;

conductor means for transmitting electrical power embedded in said coating layer; and reinforcing means embedded in said coating layer.

2. The apparatus as in claim 1 wherein said conductor means includes a plurality of individual conductive members extending generally parallel to, and circumferentially spaced around, said core.

3. The apparatus as in claim 2 wherein at least one of said individual conductive members is separately insulated.

4. The apparatus as in claim 1 wherein said conductor means includes at least one circumferentially continuous tubular conductive sheath embedded in said coating layer.

5. The apparatus as in claim 4 further including another circumferentially continuous tubular conductive sheath positioned between said glass-like material layer and said coating layer and radially spaced inwardly from said one sheath.

6. The apparatus as in claim 1 wherein said reinforcing means includes reinforcing fibers embedded in said coating layer.

7. Apparatus for interconnecting a missile launch device with a remote missile launch control station, the apparatus comprising:

a cable for transmitting electrical power and optical control signals from the control station to the launch device, said cable including (i) an integral centrally located elongated fiber core of a first glass material for transmitting optical signals, said first glass material having a first refractive index, (ii) an integral layer of glass-like material intimately surrounding said core, said glass-like material having a second refractive index less than said first refractive index, (iii) a coating layer of a glass-like material intimately surrounding said glass-like material layer, (iv) conductor means embedded in said coating layer for transmitting electrical power, and (v) reinforcing means embedded in said coating layer, said cable also including respective end portions proximate the controller station and the launch device; and said terminating means including respective electrical connectors and optical fiber connectors connected to the control station and the launch device.

8. The interconnecting apparatus as in claim 7 wherein at least the electrical connector associated with the launch device is a breakaway-type electrical connector.

9. The interconnecting apparatus as in claim 7 wherein at least the portion of the conductor means received at the launch device is configured as a pigtail.

10. The interconnecting apparatus as in claim 7 wherein at least the portion of the conductor means received at the launch device is separately electrically insulated.

11. The interconnecting apparatus as in claim 7 wherein said terminating means includes a step-dwown transformer and rectifier operatively connected to the received portion of the conductor means proximate the launch device.

* * * * *

UNITED STATES PATENT AND TRADEMARK OFFICE
CERTIFICATE OF CORRECTION

PATENT NO. : 4,895,426

DATED : January 23, 1990

INVENTOR(S) : GEORGE T. PINSON

It is certified that error appears in the above-identified patent and that said Letters Patent is hereby corrected as shown below:

IN THE SPECIFICATION:

Column 1, line 7, "and" should be followed by --in--.

Signed and Sealed this

Twenty-eighth Day of August, 1990

Attest:

HARRY F. MANBECK, JR.

Attesting Officer     Commissioner of Patents and Trademarks